W. BATES.
Covered Vessels.

No. 143,116.            Patented September 23, 1873.

Witnesses, Harry Smith
Thomas McIlwain

Wm Bates
By his Attys,
Howson and Son

UNITED STATES PATENT OFFICE.

WILLIAM BATES, OF DALE HALL, BURSLEM, ENGLAND.

IMPROVEMENT IN COVERED VESSELS.

Specification forming part of Letters Patent No. 143,116, dated September 23, 1873; application filed July 11, 1873.

*To all whom it may concern:*

Be it known that I, WILLIAM BATES, of Dale Hall, Burslem, in the county of Stafford and Kingdom of England, pottery-ware manufacturer, have invented Improvements in Tea-Pots, Coffee-Pots, Jugs, and other Covered Vessels, of which the following is a specification:

This invention relates to tea-pots, coffee-pots, kettles, jugs, and other vessels fitted with loose lids or covers; and consists of a peculiar arrangement, whereby a loose lid or cover, when adapted to such vessels, is made self-locking, so as to prevent it from falling off when the vessel is inclined in the act of pouring out its contents.

Figure 1:
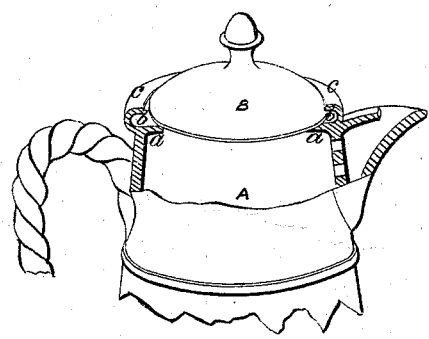

Figure 1 of the drawings annexed represents a portion of a jug fitted with a loose self-locking lid or cover according to this invention.

Figure 2:
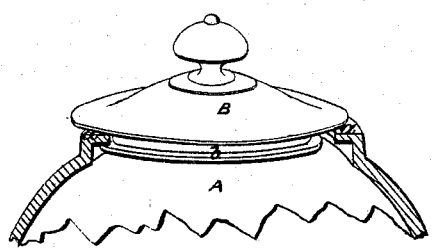

The top of the jug or other vessel A is formed with a ledge or projection, as shown at $a$, for the loose cover B to rest upon, and also with a groove, $b$, to receive and hold the cover when the jug, tea-pot, or other vessel is inclined in the act of pouring out its contents. $c$ is the upper lip of the groove, the internal diameter of which lip is just large enough to admit of the lid or cover B being dropped onto the ledge $a$. When the jug or vessel is inclined, one side or portion of the lid or cover is caused to pass into the annular groove $b$, and become locked therein, by which the lid or cover will be secured as required during the act of pouring; or, in lieu of forming the annular groove $b$ round the mouth of the vessel, as in Fig. 1, it may obviously be formed on the lid or cover itself, as shown in Fig. 2, an internally-projecting flange or ledge, $a$, being formed round the mouth of the vessel for the purpose of locking the lid or cover by entering the groove $b$ when the vessel is inclined or tilted in the act of pouring. In this modification the lid is supported on the top of the rim of the mouth of the vessel, as is clearly shown in the drawing.

I claim—

A tea-pot or other spouted vessel, having at the upper edge of its body an internal lateral recess for receiving and retaining a cover, all as set forth.

In witness whereof I have signed my name to this specification in the presence of two subscribing witnesses.

WM. BATES.

Witnesses:
   CHAS. MILLS,
      47 *Lincoln's Inn Fields.*
   FREDK. C. DYER,
      47 *Lincoln's Inn Fields.*